United States Patent [19]

Wolfram et al.

[11] Patent Number: 5,094,868
[45] Date of Patent: Mar. 10, 1992

[54] PROCESS FOR REMOVAL OF AGRICULTURAL CHEMICALS FROM SEED KERNELS

[75] Inventors: James H. Wolfram, Idaho Falls; Dane Higdem, Chubbuck, both of Id.

[73] Assignee: Huey, Inc., Cocoa Beach, Fla.

[21] Appl. No.: 583,153

[22] Filed: Sep. 17, 1990

[51] Int. Cl.$^5$ .................................. A23L 1/015
[52] U.S. Cl. ......................... 426/286; 426/460; 426/479; 426/483; 426/507; 241/6; 241/7; 241/8; 134/25.3; 210/610
[58] Field of Search ............... 426/629, 626, 460, 507, 426/479, 483, 484, 286; 241/6, 7, 8; 134/25.3; 210/610

[56] References Cited

U.S. PATENT DOCUMENTS

| | | |
|---|---|---|
| 2,379,677 | 7/1945 | Borsakovsky ................... 426/507 |
| 3,190,754 | 6/1965 | Mathews ........................... 426/626 |
| 3,264,113 | 8/1966 | Barta ............................... 426/482 |
| 3,305,441 | 2/1967 | Kohn ............................... 426/286 |
| 3,358,723 | 12/1967 | Graham ............................... 241/7 |
| 3,851,085 | 11/1974 | Rodgers ........................... 426/460 |
| 4,035,518 | 7/1977 | Carmona ........................... 426/632 |
| 4,430,357 | 2/1984 | Batscheider ..................... 426/626 |
| 4,436,757 | 3/1984 | Larye ............................... 426/507 |
| 4,946,695 | 8/1990 | Forster ........................... 426/600 |

Primary Examiner—Carolyn Paden
Attorney, Agent, or Firm—Robert A. de Groot

[57] ABSTRACT

A process for the removal of agricultural chemicals from seed grain kernels. The process includes removal of chemicals adsorbed to the surface of the seed by abrasion and removal of chemicals absorbed into the seed by extraction with organic solvents. Removal of such chemicals to a level of less than 1.0 ppm is possible.

18 Claims, 1 Drawing Sheet

PROCESS FOR REMOVAL OF AGRICULTURAL CHEMICALS FROM SEED KERNELS

BACKGROUND OF THE INVENTION

This invention relates to a method for removing agricultural chemicals, such as pesticides, insecticides, herbicides, etc. which have been applied to seed grain kernels.

In the major grain-growing countries, seed grains are raised to provide the basis for the next year's grain crop. In order to prevent or retard degradation of the seed crop after it is harvested and awaiting use or when planted in the next season, certain agricultural chemicals are applied to the seed grain kernels. Additionally, because crop pests can be imported into a country not affected by the particular pest, pesticides can be applied to the seed grain kernels in order to insure that import of the seed grain does not also result in the import of unwanted pests. Finally, unused treated seed grains may have utility for either human or livestock consumption, if the agricultural chemicals are first removed to a level such that no danger exists from contamination by the chemicals.

For example, insecticides and pesticides are applied to the seed grain kernels in a slurry in order to assure uniform application. Usually, the pesticide is applied with an indicator dye (typically red or pink) to assure that any person handling, consuming, or feeding the treated grain is aware that it is treated with potentially hazardous materials. The seed kernels are passed through a device which applies the chemicals in an aqueous slurry which applies the appropriate amount of the various chemicals. Exemplary of the chemicals applied to, for instance, seed corn, are captan (3a, 4, 7, 7a-Tetrahydro-2-[tri-chloromeththio]-4-cyclohexene-1.2-dicarboximide), also known as SR-406, orthocide-406, Vancide 89, and methoxychlor (1.1'-[2.2.2-Trichloroethylidene]-bis [4-methoxybenzene]), known as DMDT, methoxy-DDT, and malate. Captan is applied at about 800 ppm, while methoxychlor is applied at about 70-80 ppm. A conventional indicator dye is Rhodamine B.

Presently, treated seed grains are often exported to countries with less rigorous environmental and human toxicity standards; however, such practices raise ethical as well as legal issues. Such products are now treated in some states as a hazardous waste, causing great expense for their disposal by conventional means, such as landfills. A commercially practicable process which would render treated seed grains usable for feed or consumption would convert such products into an asset rather than a liability. Such process would be politically as well as environmentally advantageous, given the current desire to minimize waste production and develop technologies permitting waste materials to be upgraded and/or recycled.

Therefore, it is an object of the present invention to provide a process whereby seed grains treated with agricultural chemicals, such as insecticides, fungicides, and herbicides, are rendered usable for human or livestock consumption.

SUMMARY OF THE INVENTION

This invention comprises a process for the removal of agricultural chemicals from seed grain kernels, thereby reducing the quantity of waste to be disposed of as a result of surplus seed grain kernels. Because not all pesticides are adsorbed to the same degree and because different seeds retain pesticides with different tenacity, this process removes substantially all chemicals from the seed grain kernels. The process includes the steps of abrading the surface of the kernel, soaking the kernel to remove the pericarp, grinding the kernel, and then subjecting the ground kernels to at least one extraction step with a non-polar organic solvent. Certain agricultural chemicals adsorbed onto the surface of the kernel can be removed simply by abrasion, while others (lipid soluble) are absorbed into interior portions of the seed kernels and removal requires that the kernel be comminuted to permit the solvent to penetrate the endosperm. Exemplary non-polar organic solvents are toluene, ethylacetate, chloroform, methylene chloride, carbon tetrachloride, and others having similar properties.

Abrasion of the seed can take any convenient form. Applicant has found that tumbling the seed kernels with sand and/or glass particles adequately removes the pesticide from outer seed layers. Soaking the seed to remove the pericarp is enhanced by using an alkaline solution, preferably having a pH of about 12.5 or greater. Comminution of the kernels is also by conventional means, such as a roller mill, to a size sufficient to permit the organic solvent to adequately contact the chemical-bearing portions. While a single extraction step may be sufficient, in order to remove the chemicals to below the 1.0 ppm level, multiple extractions may be necessary.

Figure 1:
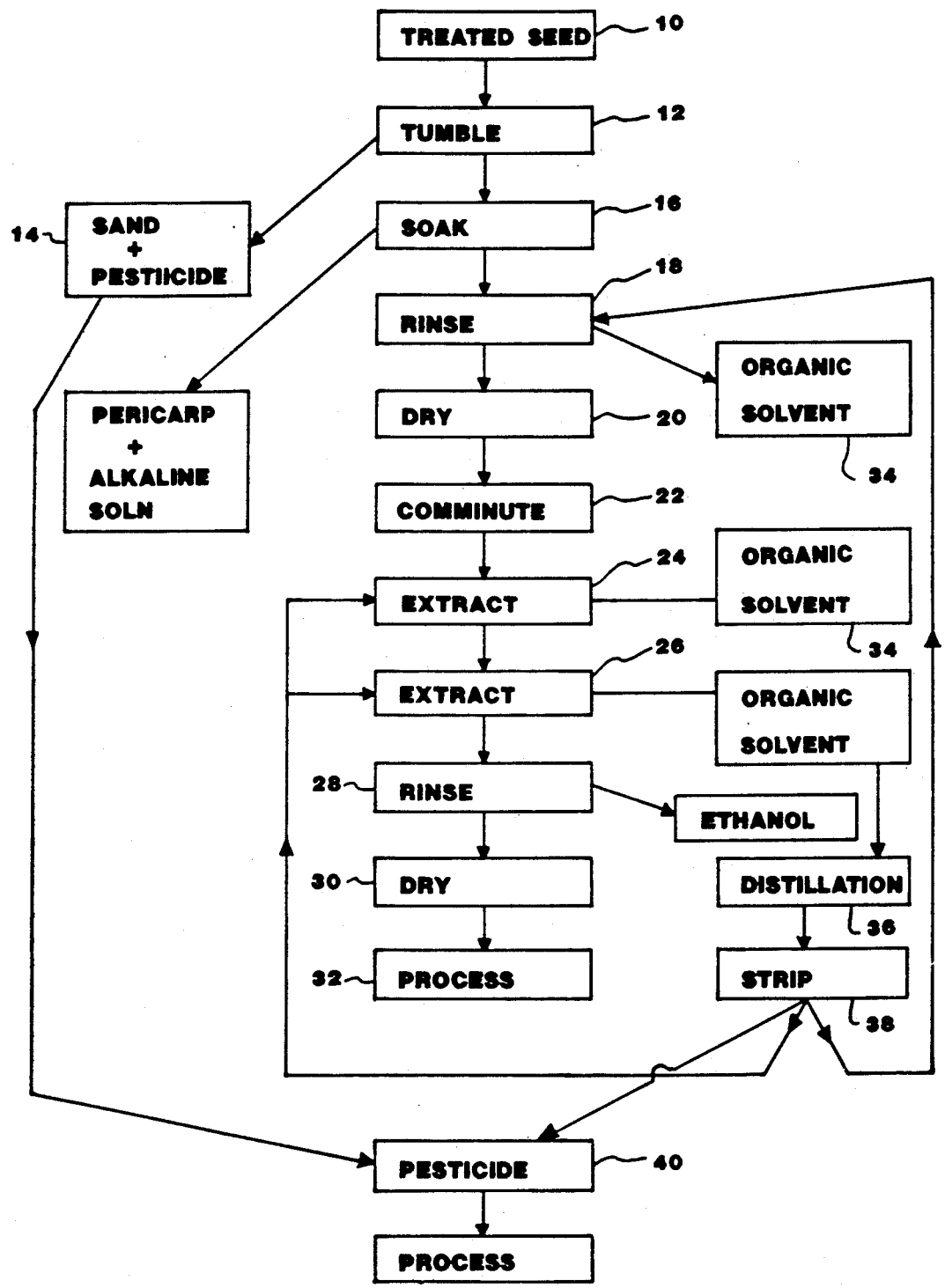
FIG. 1 is a process flow diagram illustrating the process of the present invention.

The process of the present invention is illustrated diagrammatically in FIG. 1. As illustrated therein, seed treated with agricultural chemicals is subjected to the inventive process. Seed grain kernels may be treated with a wide variety of chemicals to retard degradation, such as pesticides and insecticides. Such chemicals reduce the risk that the seed grain kernel will be eaten by pests or fail to germinate when planted the next year due to microbial attack. The commonly used pesticides, such as captan and methoxychlor, are especially noxious and are dealt with in detail below. However, it is to be appreciated that a broad range of such chemicals may be used and may be treated with the process described hereinbelow. For example, methoxychlor is a DDT-type chemical, and it is believed that many other similar seed grains could be treated in the process of this invention, such as sorghum, wheat, sweet corn, milo, and popcorn.

As set forth in FIG. 1, treated seed grain kernels 10 are tumbled 12 in any conventional tumbling apparatus with a material designed to abrade the surface of the seed grain kernel. Sand, glass beads, or pieces of aggregate may be useful in this step. Certain agricultural chemicals can be easily removed simply by this abrasion step if they are adsorbed onto the surface of the kernel and not absorbed, or absorbed only into the outer portions of the exocarp, a major portion of which is removed in the tumbling step 12. For example, as set forth in more detail below, a significant portion of the captan can be removed simply by abrasion.

The abrasive particles and the chemicals removed by abrasion are separated and the particles reused. The abraded seed kernels are then soaked 16 in an alkaline solution to remove the pericarp from the kernel. The alkaline solution can be re-used following conventional extraction techniques. While a pH of at least 10.0 is necessary for pericarp removal, it has been found that a pH of about 12.5 is preferable. Thereafter, the seed is rinsed 18 in an organic solvent to remove any chemicals beneath the pericarp, prior to comminution.

The seeds are then dried 20 and comminuted 22. Drying may be by conventional means, preferably air-drying. The method of comminution is not critical; however, a major portion of the comminuted corn should be capable of passing through a U.S. No. 4 mesh screen. Comminution has been found necessary to remove chemicals absorbed into the interior portions of the seed kernel, as extraction with organic solvents without comminution does not adequately remove the chemicals.

The comminuted seeds are then subjected to at least one extraction 24, 26 with an organic solvent. The number of extractions will depend upon the particular chemicals to be removed, and their concentration in the seed. Generally speaking, non-polar organic solvents are preferred in this step, since they are not miscible with water. Solvents such as chloroform, carbon tetrachloride, toluene, and methylene chloride work better than ethanol, and acetonitrile. The extraction is most easily accomplished by simply combining the seed with the desired solvent in a ratio of at least 1:5 (on a weight basis). The seeds are continuously agitated in the presence of the solvent, at room temperature. Extraction of all the chemicals present occurred after about 30-60 minutes of extraction.

An alternative extraction procedure is accomplished by refluxing the seeds at the boiling point of the solvent at ambient pressure for approximately 30 minutes.

After the chemicals are extracted from the ground seed with the organic solvent, the seed is then rinsed 28 with, for instance, ethanol, to remove any traces of the toxic, extraction organic solvent. The seed is then dried 30 and is in condition for processing 32 into the desired end product.

The organic solvent recovered from the process (at 34) can be processed by distillation 36 and stripping 38. It has been found that virtually all (99.9%) of the chemicals can be separated from the solvent and vegetable extracts by stripping through distillation. Because the most useful solvents have a relatively low boiling point and the vegetable oils and chemicals have a relatively high boiling point, a clean separation can be achieved. Once the solvent has been evaporated and condensed for reuse, the chemicals are stripped away and are in a concentrated form. The concentrated agricultural chemicals can be recovered for reuse or further processed to render them non-toxic for disposal by conventional processes, such as incineration, burial, bioprocessing with microorganisms, etc. The quantity of hazardous material to be dealt with as a result of the process of this invention, since it is essentially in the form of the chemical itself without carrier materials (such as the seed grain kernels), is substantially less than it was initially (as at 10); and therefore, disposal costs will be reduced proportionally. It is possible that the hazardous chemical separated and concentrated in the process of this invention can be reused and recycled for additional use.

The process of this invention will be illustrated by the following example.

EXAMPLE

Seed corn treated with approximately 800 ppm captan and about 70-80 ppm methoxychlor was obtained from a seed grain dealer. Captan has a melting point of about 172° C. and is essentially insoluble in water but is soluble in chloroform, toluene, and some other non-polar organic solvents. Methoxychlor has a melting point of about 87° C., is practically insoluble in water, and has organic solubilities similar to DDT.

Because pesticides are applied only to the surface of the seed grain kernel, it was hypothesized that such chemicals could be rather easily removed by simple surface treatments, such as abrasion, washing/rinsing, or treatment with UV light.

A. The literature indicates that captan and methoxychlor can be degraded by application of UV light at 254 nm. Samples of the seed corn were subjected to 254 nm light for 20 minutes on each side. After exposure, the seeds were ground to a flour and extracted with chloroform, but no significant reduction in either pesticide was noted when compared to seeds not treated with UV light.

TABLE 1

|  | w/o UV exposure (ppm) | with UV exposure (ppm) |
|---|---|---|
| Captan | 13.8 | 15.0 |
| Methoxychlor | 32.2 | 26.6 |

B. Hydrolysis of captan and methoxychlor was attempted by adjusting the pH of an aqueous solution within which the seeds were soaked. The water was adjusted to pH 3.0, 5.0, 7.0, and 9.0 by the addition of sulfuric acid or sodium hydroxide. Test tubes were provided with 125 ppm methoxychlor or captan and filled to 10 ml with water adjusted to the appropriate pH. The samples were then shaken for 72 hours and extracted for determination of the level of hydrolysis. As illustrated in Table 2, hydrolysis of captan is possible (although not to the 1 ppm level), but methoxychlor is stable at all pH levels under the conditions tested.

TABLE 2

|  |  | Concentration (ppm) at pH | | | |
|---|---|---|---|---|---|
|  |  | 3.0 | 5.0 | 7.0 | 9.0 |
| Beginning Concentration: |  |  |  |  |  |
| Captan | 125 ppm | 5.0 | 0.0 | 0.0 | 0.0 |
| Methoxychlor | 125 ppm | 120.0 | 118.0 | 138.0 | 118.0 |

C. In order to determine the location of captan and methoxychlor within the seed, various parts of the seed were tested for the pesticides. It was determined that captan is located primarily in the exocarp and is not inside the seed. Methoxychlor is bound both to the exocarp and inside the seed, primarily in the embryo. Therefore, it is apparent that methoxychlor is lipid soluble and, in order to remove it to the desired level (less than 1.0 ppm) from the seed by extraction, the seed must be comminuted.

Commercially treated seed corn having approximately 700 captan and approximately 70-80 ppm methoxychlor were tumbled in a horizontal rotary tumbler for 30-60 minutes in a mixture of sand and glass particles. The sand and glass were separated from the corn by screening, and the corn soaked in an aqueous solution of sodium hydroxide at pH 12.5 for 10-30 minutes to loosen the pericarp of the seeds. The alkaline solution was then drained off, and the pericarp was removed manually from the seeds. The seeds were then rinsed with chloroform and air dried. The seeds were then comminuted in a roller mill and reduced in size such that a major portion of the seeds passed through a U.S. No. 4 mesh screen. The milled seed was then twice extracted with ether, chloroform, or toluene by stirring in a flask. The ground seeds were then rinsed with ethanol to remove any traces of the solvent. The seed pieces were then air dried and tested for the presence of the agricultural chemicals.

As illustrated in Table 3, the process of the present invention

TABLE 3

| Extraction No. | Amount Remaining (in ppm) | |
|---|---|---|
|  | Methoxychlor | Captan |
| Ethylacetate |  |  |
| 1 | 6.14 | 0.0 |
| 2 | 0.167 | 0.0 |
| 3 | 0.057 | 0.0 |
| Toluene |  |  |
| 1 | 4.43 | 0.0 |
| 2 | 0.080 | 0.0 |
| 3 | 0.048 | 0.0 | reduces the level of captan to non-detectable levels after just the first extraction, with either ethylacetate or toluene. This is not wholly unexpected since it was earlier determined that most of the captan is adsorbed primarily on the pericarp, which is removed during the abrasion step. Methoxychlor is removed to below 1.0 ppm after the first extraction with either ethylacetate or toluene, and essentially all is removed after three extractions. It was determined that a portion of the methoxychlor was absorbed into the inner portions of the seed and is bound to the interior portions of the seed, rendering it non-removable from the intact seed unless the seed is ground in order to expose greater surface area for contact with the solvent.

While the process of the present invention has been described with reference to specific organic solvents and specific agricultural chemicals, it is to be understood that the process is applicable to a wide range of solvents and chemicals. Therefore, the scope of the present invention is not to be limited by the disclosures herein but rather only by the claims appended hereto.

What is claimed is:

1. A process for removing agricultural chemicals from seed grain kernels comprising the steps of:
   a. abrading the surface of the grain kernels to remove said chemicals adhered to the surface thereof;
   b. soaking the kernel of step a. in an alkaline solution having a pH of greater than 10.0 in order to facilitate removal of the pericarp from said kernel;
   c. rinsing the kernel of step b. in an organic solvent;
   d. grinding the kernel; and
   e. extracting remaining chemicals from the ground kernel of step d. with an organic solvent thereby providing a low-level chemical content of less than 1.0 ppm in the seed.

2. The process of claim 1, further comprising the step of abrading the grain kernel by tumbling the kernel with abrasive particles for a period of at least 30 minutes.

3. The process of claim 1, further comprising the step of soaking the kernels in an alkaline solution having a pH of about 12.5.

4. The process of claim 1 after step b., further comprising the step of removing the pericarp from the grain kernel and extracting chemicals therefrom separately from the remainder of the grain kernels.

5. The process of claim 1, further comprising the step of rinsing the kernel in an organic solvent in step c. wherein the organic solvent is a non-polar organic solvent.

6. The process of claim 5, further comprising the step of selecting the non-polar organic solvent from the group consisting of toluene, chloroform, and methylene chloride.

7. The process of claim 1, further comprising the step of grinding the grain kernel of step d. to an average particle size such that substantially all of the particles pass through a U.S. No. 4 mesh screen.

8. The process of claim 1, further comprising the step of extracting chemicals from the ground seed of step e. with a non-polar organic solvent.

9. The process of claim 1, wherein the agricultural chemicals are a pesticide and further comprising the step of extracting the pesticide from the grain to a level of less than 1.0 ppm.

10. The process of claim 1, further comprising the step of subjecting the ground kernel of step e. to multiple sequential extractions using an organic solvent.

11. The process of claim 1, further comprising the step of bioprocessing the remaining chemicals of step e. with microorganisms to render such chemicals non-toxic.

12. The process of claim 1, wherein the agricultural chemical is selected from the group consisting of captan and methoxychlor.

13. A method of removing agricultural chemicals from seed grain kernels, comprising the steps of:
   a. subjecting the kernels to abrasion for a time sufficient to remove a major portion of said chemicals adhered to the surface thereof;
   b. grinding the kernels to reduce the particle size thereof and to expose the interior portions of said kernel; and
   c. extracting said chemicals from interior portions of said kernel with at least one extraction with an organic solvent thereby providing a low-level chemical content of less than 1.0 ppm in the kernel.

14. The method of claim 13, wherein after step 1. soaking the kernels in an alkaline solution having a pH of at least 10.0 removes the pericarp from said kernel, prior to grinding the kernels.

15. The method of claim 14, wherein after soaking, rinsing the kernels in an organic solvent further removes said chemicals from outer portions of said kernel.

16. The method of claim 13, wherein the organic solvent is selected from a group of non-polar solvents.

17. A method of removing agricultural chemicals from seed grain kernels comprising the steps of abrading the surface of the kernels in order to remove chemicals adhered to the surface thereof and removing remaining chemicals from the interior of the kernels by extracting said chemicals with an organic solvent thereby providing a low-level chemical content of less than 1.0 ppm in the kernels.

18. The method of claim 17, further comprising subjecting the abraded seed kernels to multiple extractions with an organic solvent.

* * * * *